United States Patent [19]

Miyabe

[11] Patent Number: 4,977,943
[45] Date of Patent: Dec. 18, 1990

[54] WASTE PAPER DE-INKING PROCESS USING MULTI-STAGE VERTICAL COLUMN VAPOR-LIQUID MIXER

[75] Inventor: Noriji Miyabe, Ishinomaki, Japan

[73] Assignee: Jujo Paper Co., Ltd., Tokyo, Japan

[21] Appl. No.: 349,080

[22] Filed: May 9, 1989

[30] Foreign Application Priority Data

May 14, 1988 [JP] Japan ................ 63-117858

[51] Int. Cl.$^5$ ............................................. D21C 5/02
[52] U.S. Cl. ............................................. 162/4; 162/5;
162/55; 209/170; 210/221.2; 210/704
[58] Field of Search ........... 162/4, 5, 55; 209/170; 210/221.2, 262, 704

[56] References Cited

U.S. PATENT DOCUMENTS

| | | | |
|---|---|---|---|
| 4,066,540 | 1/1978 | Wada et al. | 210/221.2 |
| 4,186,094 | 1/1980 | Hellberg | 210/221.2 |
| 4,332,638 | 6/1982 | Mauer et al. | 162/5 |
| 4,360,402 | 11/1982 | Ortner et al. | 162/5 |
| 4,368,101 | 1/1983 | Bahr et al. | 162/5 |
| 4,851,036 | 7/1989 | Anthes et al. | 75/2 |

FOREIGN PATENT DOCUMENTS 35094 2/1985 Japan ............................. 209/170
60-57903 12/1985 Japan .
61-8196 3/1986 Japan .

*Primary Examiner*—Karen M. Hastings
*Attorney, Agent, or Firm*—Oliff & Berridge

[57] ABSTRACT

A waste paper de-inking system of this invention agitates and mixes waste paper dissolving slurry and treating gas by a multi-stage type vapor-liquid mixer before a floatator treating step, separates and finely pulverizes ink and sticky matters adhered to fiber in the waste paper dissolving slurry and sufficiently absorbs and contains the treating gas in the slurry before reaching the lower most stage to facilitate de-inking operation in later floatators. Further, the high tower multi-stage vapor-liquid mixer can be utilized also as a floatator to reduce a required floor area and required power consumption of the system.

Further, high temperature exhaust gas containing $SO_2$ produced in a factory is utilized as the treating gas to perform various operations, such as desulfurization, heat recovery, bleaching and also purification of a factory environment, thereby a more economical waste paper de-inking system is provided.

12 Claims, 5 Drawing Sheets

WASTE PAPER DE-INKING PROCESS USING MULTI-STAGE VERTICAL COLUMN VAPOR-LIQUID MIXER

BACKGROUND OF THE INVENTION

1. Field of the Invention

This invention relates to a system for producing de-inked pulp from recovered waste paper which is useful for natural resources saving and energy saving in a papermaking industry.

2. Prior Art

Recently, particularly during twenty years, the development of a waste paper de-inking facility has been adopted as an important theme as disclosed in Japanese Patent Publication Nos. 57903/1985 and 8196/1986, and a number of floatators have been developed as the important component of the de-inking facility.

In order to raise the de-inking effect of waste paper and to improve the whiteness of obtained waste paper pulp, problems arise in the conventional de-inking facilities, such as the facilities are successively multiplexed, increased in its required floor area upon increasing of its scale, enhanced in its facility cost as a whole, increased in energy consumption of electricity and heat sources, and thus raised increasingly in its operation expenditure.

SUMMARY OF THE INVENTION

Accordingly, it is an object of this invention to provide a more economical waste paper de-inking system which facilitates operations, such as separation of adhered matters from fiber with a multi-stage vapor-liquid mixer, can reduce required floor area and required power consumption of an entire and which also performs operations, such as desulfurization, heat recovery and bleaching by utilizing high temperature waste gas containing $SO_2$ produced in a factory as treating gas to purify a factory environment.

This invention comprises a high tower multi-stage vapor-liquid mixer having multiple stages of porous plates mounted in a high tower housing, and supplies waste paper dissolving slurry from above the vapor liquid mixer and de-inking gas, such as air, factory exhaust gas, etc. which does not damage fiber from below the vapor liquid mixer. The waste paper dissolving slurry thus supplied drops from porous plates of the respective stages to lower stages, and the treating gas rises from the porous plates of the respective stages to upper stages to from an agitated mixture layer of the waste paper dissolving slurry and the treating gas on the porous plates of the respective stages. In the agitated mixture layer, adhered matters adhered to the fiber in the waste paper dissolving slurry and foreign matters are separated and finely pulverized, the treating gas is absorbed and contained in the waste paper dissolving slurry, and the treated slurry gathered in the bottom of the housing is fed to the next de-inking step including floatators.

Then, the vapor-liquid mixer is employed to separate and finely pulverize the adhered matters adhered to the fiber in the waste paper dissolving slurry and the foreign matters in the agitated mixture layer, and to absorb, contain and foam the treating gas into the waste paper dissolving slurry. The foamed floating matters floated in the respective agitated mixture layers and the treated slurry gathered in the bottom of the housing are respectively fed to the next de-inking steps.

Further, this invention preferably solves the above-mentioned subjects by providing a waste paper de-inking system having a plurality of floatator rows and one or more vapor-liquid mixers disposed intermediate of the floatator rows, a waste paper de-inking system supplying de-inking agent to be added to the waste paper de-inking slurry supplied to the vapor-liquid mixer or the intermediate of the vapor-liquid mixer the waste paper de-inking system supplying treating gas including less $SO_2$ content to the former stage and treating gas including more $SO_2$ content to the later stage, and particularly the waste paper de-inking system supplying treating gas of high temperature exhaust gas to the vapor-liquid mixture.

This invention provides scrubbing effect of separating and finely pulverizing adhered matters, such as inks, and tacky matters from the fiber in the waste paper dissolving slurry by the above-mentioned various means with the vapor-liquid mixture provided before and at the intermediate of the floatator rows to reduce power consumption with less stages and to improve the de-inking effect. Further, this invention utilizes a boiler exhaust gas and the like containing a large quantity of contents of various exhaust gas, by-product gas particularly high temperature drier exhaust gas, high temperature and high $SO_2$ content boiler exhaust gas which does not damage the fiber generated in pulp, papermaking factory as treating gas, thereby to perform not only mechanical de-inking operation, but neutralization of alkali of de-inked agent elimination of alkali neutralizer, improvement of bleaching effect with $SO_2$, heat recovery, and purification of factory environment, etc. simultaneously.

DESCRIPTION OF THE PREFERRED EMBODIMENTS

Figure 1:
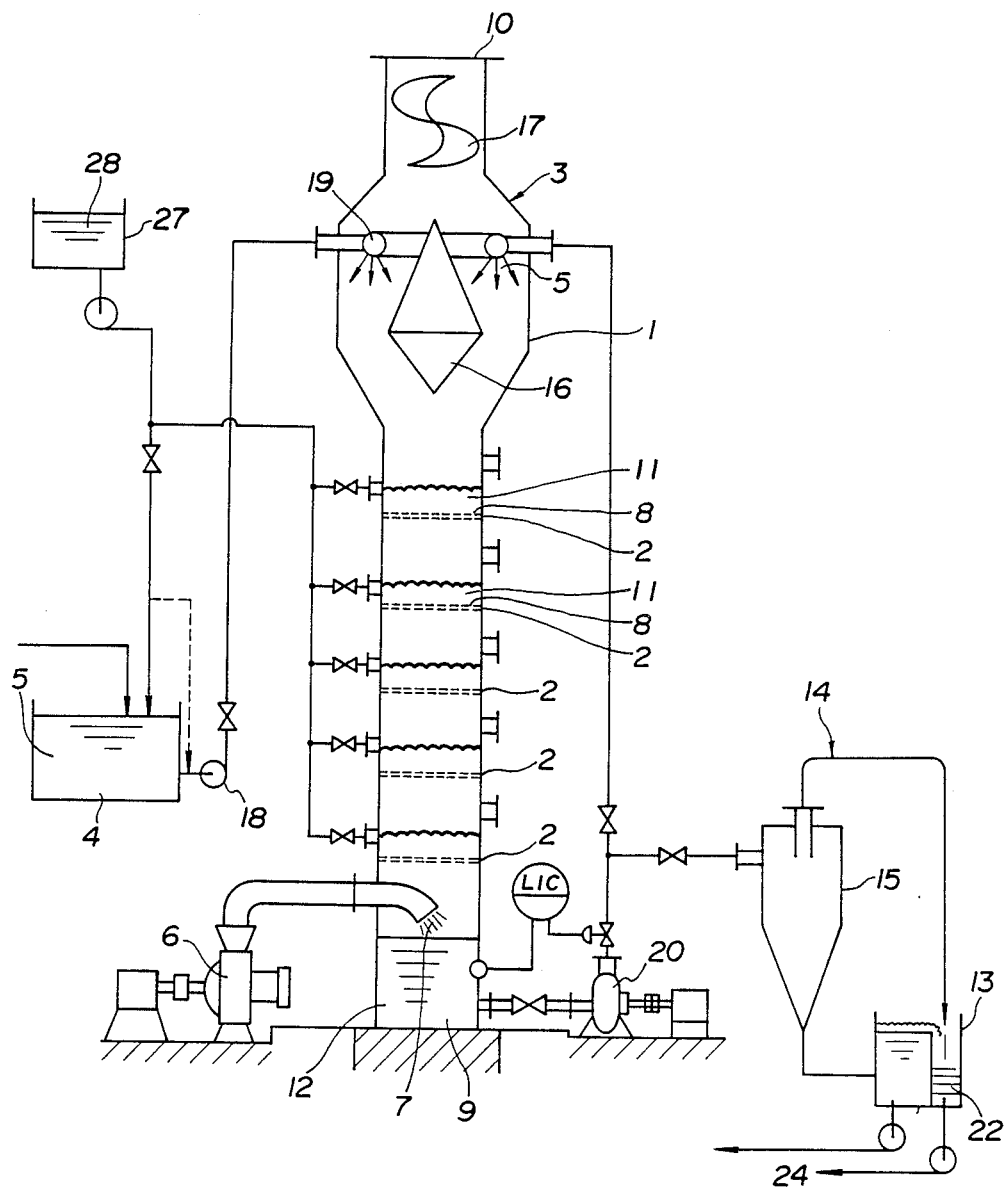
FIG. 1 is a systematic diagram of an arrangement including a schematic sectional view of a first embodiment of a waste paper de-inking system according to the present invention.

Embodiments of this invention according to the present invention will be described with reference to accompanying drawings.

In a first embodiment shown in FIG. 1, a high tower multi-stage vapor-liquid mixer 3 having porous plates 2, 2 in multiple stages (five stages in the embodiment shown) is provided in a high tower housing 1, waste paper dissolving slurry 5 is supplied by a waste paper dissolving slurry pit 4 from above the vapor-liquid mixer 3, and treating gas 7 is supplied by a de-inking gas fan 6 from below the vapor-liquid mixer 3. The waste paper dissolving slurry 5 is sequentially dropped from the pores 8, 8 of the porous plates 2, 2 of the respective stages to their lower porous plates 2, and eventually stored in the bottom 9 of the housing 1. The treating gas 7 is successively raised from the pores 8, 8 of the porous plates 2 of the lowermost stage to the porous plates 2 of the upper stages, and eventually exhausted from an exhaust port 10 opened at the top of the high tower housing 1. As shown in FIG. 2, the agitated mixture layers 11,11 composed of the waste paper dissolving slurry 5 and the treating gas 7 are respectively formed on the porous plates 2, 2 of the respective stages. In the agitated mixture layer 11, adhered matters adhered to the fiber in the waste paper dissolving slurry 5 and foreign matters are separated and finely pulverized, the treating gas 7 is adsorbed and contained in the waste paper dissolving slurry 5, and the treated slurry 12 gathered in the bottom 9 of the housing is fed to next de-inking step 14 including a floatator 13.

Figure 2:
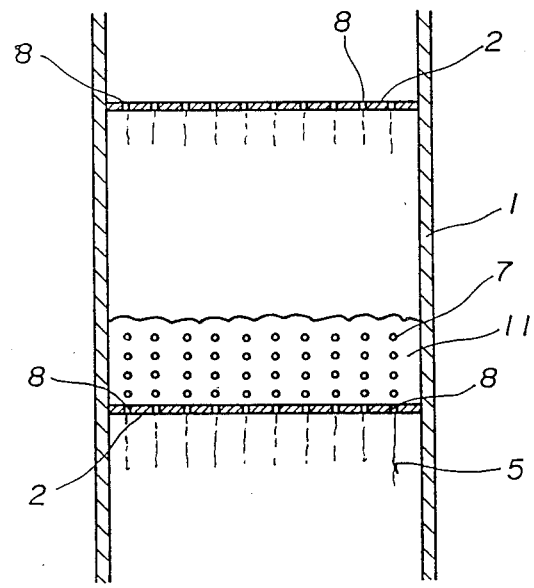
FIG. 2 is an enlarged sectional view of an agitated mixture layer of FIG. 1.

FIG. 1 shows the waste paper de-inking system having a centrifugal separator 15 provided before the floatator 13 in the de-inking step 14, and a slurry commutator 16 and an exhaust gas commutator 17 provided at the upper part of the high tower housing 1. The waste paper dissolving slurry 5 is supplied from the pit 4 through a pit pump 18 and a slurry supply port 19 to the vapor-liquid mixer 3, the treated slurry 12 in the bottom 9 of the housing 1 is fed through a housing bottom pump 20 to the next de-inking step 14, and piped to the slurry supply port 19 to be able to be recirculated The level of the treated slurry 12 in the bottom 9 of the housing 1 can be controlled by a LIC.

Figure 3:
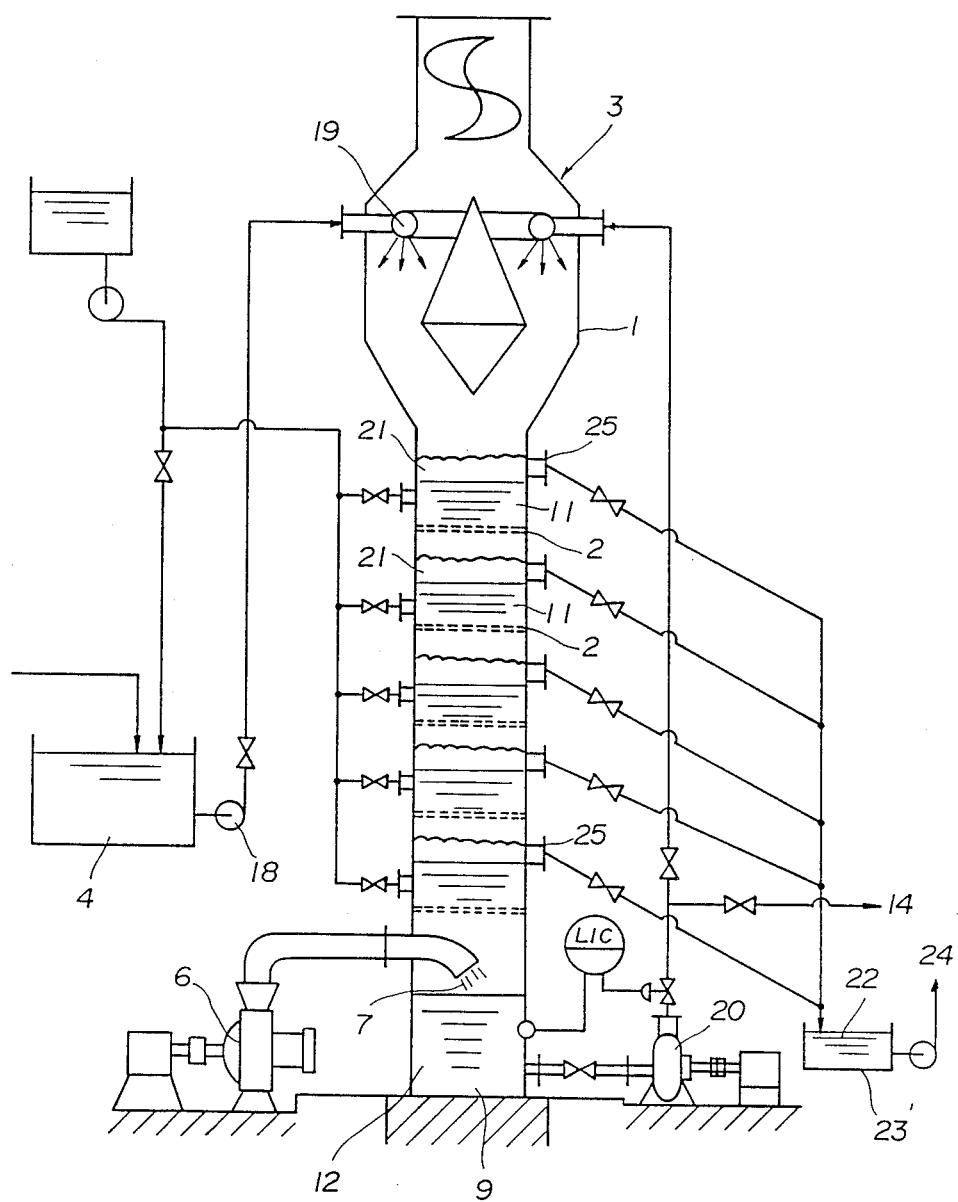
FIG. 3 is a systematic diagram of an arrangement including a schematic sectional view of a second embodiment of the invention.

In a second embodiment of the invention shown in FIG. 3, the constitution of a vapor-liquid mixture 3 is substantially the same as that of the first embodiment. In this second embodiment, treating gas 7 is absorbed and contained in waste paper dissolving slurry 5 in an agitated mixture layer 11 on respective porous plates 2, and a foamed floating matter layer 21 is formed on the respective agitated mixture layer 11. Foamed floating matter(froth) 22 in the foamed floating matter layer 21 is discharged separately from the treated slurry 12 gathered in the bottom 9 of the housing 1 to a froth pit 23 from a froth outlet 25 as shown in FIG. 4, and fed to a froth treating step 24 to be treated.

Adhered matters made of ink, adhesive, synthetic resin and the like adhered to the fiber and foreign matters in the waste paper dissolving slurry 5 are mainly gathered in the froth 22. The froth 22 can be easily discharged by raising the pressure in the high tower housing 1 slightly higher than the atmosphere by controlling the supplying amount of the treating gas 7 and the exhausting amount of the exhaust gas commutator 17.

In this embodiment, the vapor-liquid mixer 3 may be utilized also as a floatator.

Figure 4:
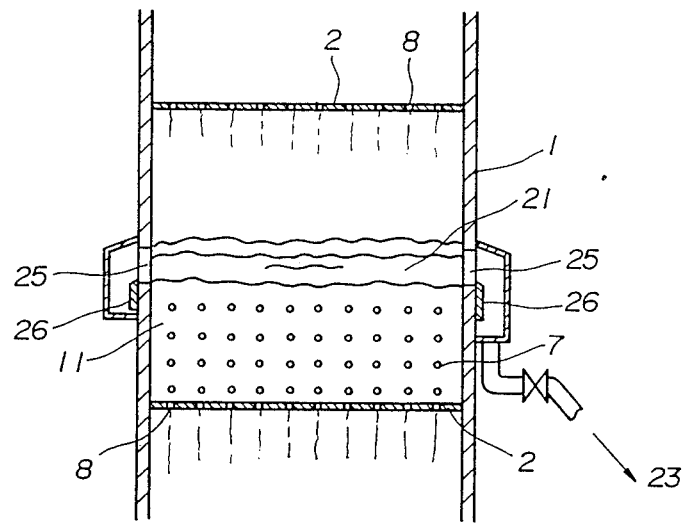
FIG. 4 is an enlarged sectional view of an agitated mixture layer of FIG. 3.

In the embodiment shown in FIG. 4, a plurality of froth outlets 25 are opened at the periphery of the high tower housing 1, and the opening of the outlets, the exhausting amount and the level of the agitated mixture layer 11 are regulated by a regulator 26.

In the second embodiment as described above, in the agitated mixture layer 11, ink adhered to fiber in the waste paper dissolving slurry 5, light matters such as laminated plastic, sticky matters such as adhesives and the like, and foreign matters are separated, exfoliated, finely pulverized, and precipitated on the foam face of the foaming treating gas 7 rising from below, or floated together with foams to form a foamed floating matter layer 21. Accordingly, as the foamed floating matter layer 21 is extracted from the froth outlet 25, the foreign matters in the waste paper dissolving slurry 5 are gradually removed from the upper stage to the lower stage, and gathered in the bottom 9 of the housing 1.

The treated slurry 12 in the bottom 9 of the housing 1 is again recirculated, as required, by a housing bottom pump 20 from the slurry supply port 19 to the vapor-liquid mixer 3 to be further purified. The treated slurry 12 which is not recirculated is fed to the next de-inking step 14.

The vapor-liquid mixer designated in the first embodiment can be connected in series with that shown in the second embodiment for use. Further, the vapor-liquid mixers shown in the second embodiment are used in series, vapor-liquid mixer of secondary side can be used to purify the treated slurry 12 from the vapor-liquid mixer of primary side, and from the vapor-liquid mixer of primary side, and can also be utilized as a froth treating and recovering unit for separating the fiber and foreign matters from the froth 22 derived from the primary vapor-liquid mixer.

Figure 5:
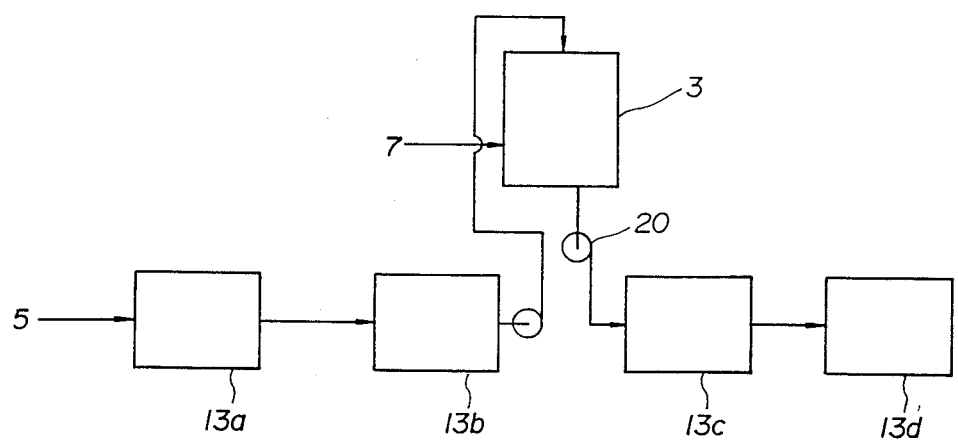
FIG. 5 is a systematic diagram of an arrangement of a third embodiment of the invention.

In a third embodiment shown in FIG. 5, there is shown a waste paper de-inking system for further accelerating the waste paper de-inking effect by inserting the vapor-liquid mixer 3 similar to that of the first or second embodiment into the intermediate between the intermediate floatator 13b of a plurality of floatators 13 (four stages of 13a, 13b, 13c, 13d in the exemplified example as shown) and the floatator 13c, and feeding the treated slurry from the vapor-liquid mixer 3 to the floatators 13c, 13d of the rear stages.

In a fourth embodiment, de-inking agent is added into waste paper dissolving slurry as shown in FIG. 1 and 3. In other words, de-inking agent 28 is added from a de-inking agent tank 27 to waste paper dissolving slurry 5 in waste paper dissolving slurry pit 4. The agent 28 may be added to the inlet of the pit pump 18. When the waste paper dissolving slurry 5 added with the de-inking agent 28 is supplied to the vapor-liquid mixer 3, the de-inking operation of the separation, exfoliation of adhered matters and foreign matters from the fiber of the waste paper dissolving slurry 5 is further accelerated.

The addition of the de-inking agent 28 to the waste paper dissolving slurry 5 may be performed to the agitated mixture layers 11 on the respective porous plates 2 at the intermediate of the vapor-liquid mixer 3.

Alkali may be employed as a de-inking agent. Further, de-inking agent to be added to the front and rear stages of agitated mixture layers 11, 11 formed in multiple stages may be different in types to further accelerate the de-inking operation.

As a fifth embodiment, treating gases supplied to a vapor-liquid mixer are different in types between the front stages and the rear stage. In the waste paper de-inking system of this type, a single vapor-liquid mixer is employed, and as treating gas 7 initially air itself which does not substantially contain $SO_2$ or exhaust gas produced in a factory, such as scrubber exhaust gas containing less $SO_2$ content is used, and in case of recirculating the waste paper dissolving slurry, boiler exhaust gas containing more $SO_2$ content is employed.

Further, two vapor-liquid mixers are employed in series, gas containing substantially no $SO_2$ is used as treating gas of primary vapor-liquid mixer of the front stage, and gas containing more $SO_2$ content may be used as treating gas of the secondary vapor-liquid mixer of the rear stage.

In this manner, there is provided a waste paper de-inking system which can, in addition to the increase in the treating effect of adhered matter from the fiber and foreign matters in waste paper dissolving slurry during vapor-liquid mixing process of the front and rear stages, synergistically perform neutralizing effect of alkaline de-inking agent added slurry with $SO_2$ and slurry bleaching effect in the rear stage.

Exhaust gas containing the $SO_2$ is used as treating gas to operate desulfurizing operation in the waste paper de-inking system, and to economically perform desulfurizing from various exhaust gases and environment purifying in a papermaking pulp factory.

Particularly, exhaust gases from a high temperature drying machine, a scrubber, and a boiler, etc., generated in a factory are employed as treating gas to be supplied to the vapor-liquid mixer to improve heat recovery and de-inking effect, to perform the environment purification in and out of the factory, and to improve the thermal efficiency in the entire factory.

Figure 6:
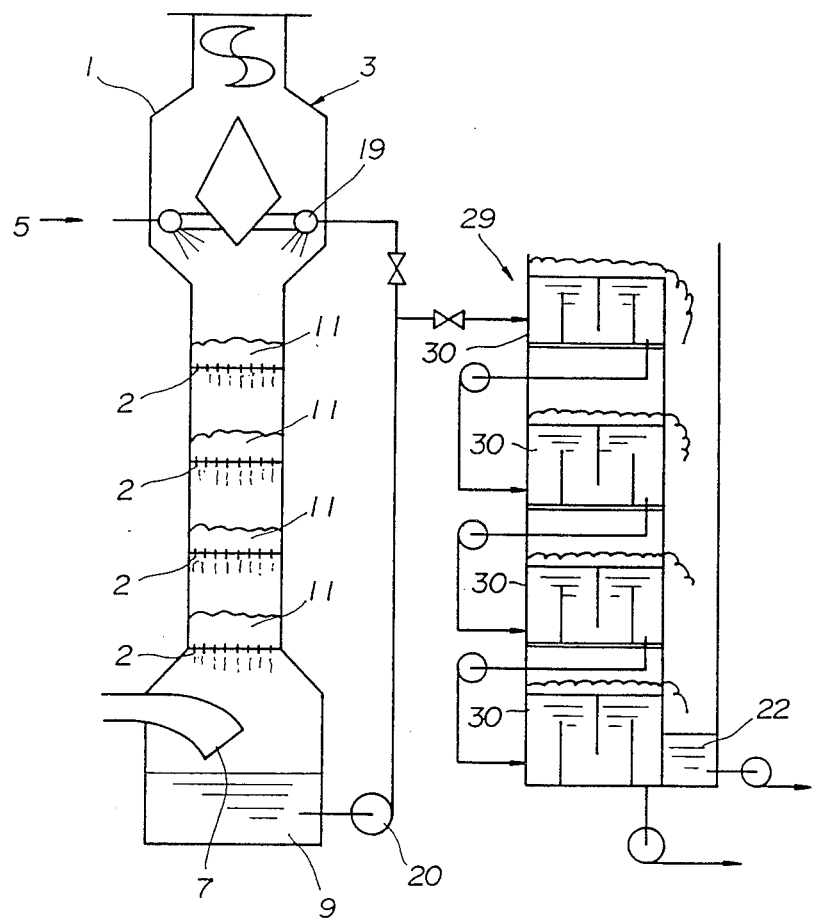
FIG. 6 is a systematic diagram of an arrangement including multi-stage floatators.

FIG. 6 shows still another embodiment in which multi-stage floatators 29 are provided corresponding to high tower multi-stage vapor-liquid mixer 3. This waste paper de-inking system has a constitution such that treated slurry 13 is sequentially fed to unit floatators 30 of lower stages from unit floatator 30 of uppermost stage while removing froth 22 by the respective unit floatators 30. Thus, an installing area can be reduced, and power consumption can be also decreased.

According to the waste paper de-inking system in accordance with the present invention as described above, the waste paper dissolving slurry and the treating gas are agitated and mixed by the vapor-liquid mixers of multiple stage type before floatator treating step, the ink and sticky matters adhered to the fiber in the waste paper dissolving slurry are separated, finely pulverized, and the treating gas is sufficiently absorbed and contained in the slurry, thereby facilitating the de-inking in the later floatator step. Further, this invention facilitates the operations, such as the separation of the adhered matters from the fiber based on the scrubbing effect of the treating gas by the fluidized layer type vapor-liquid mixer, can utilize the high tower multi-stage type vapor-liquid mixer also as the floatator to reduce the required floor area and required power consumption of the waste paper de-inking system. Moreover, this invention provides large de-inking effect, utilizes exhaust gas containing $SO_2$ and high temperature exhaust gas produced in a factory as treating gas to provide a waste paper de-inking system which can economically perform various operations, such as desulfurization, heat recovery and bleaching, and also purification of a factory environment.

What is claimed is:

1. A waste paper de-inking process comprising the steps of:
   supplying waste fiber paper dissolving slurry from above a high tower multi-stage vapor-liquid mixer having at least one porous plate in each of a multiplicity of stages arranged in a vertical column;
   supplying de-inking treating gas which does not damage the fiber from below said vapor-liquid mixer, said waste paper dissolving slurry thus supplied dropping from porous plates of the respective stages to lower stages, said de-inking treating gas being raised from the porous plates of the respective stages to upper stages to form an agitated mixture layer of the waste paper dissolving slurry and the treating gas on each porous plate of the respective stages;
   adding de-inking agent to each respective agitated mixture layer on the porous plates in said vapor-liquid mixer; and in the agitated mixture layer, separating and finely pulverizing adhered matters adhered to the fiber and foreign matters in the waste paper dissolving slurry, absorbing and containing the de-inking treating gas in the waste paper dissolving slurry, and gathering the treated slurry in a bottom of the vertical column.

2. The waste paper de-inking process according to claim 1, wherein two of said vapor-liquid mixers are used in series to form a process having front and rear stages, and further comprising supplying treating gas containing a first $SO_2$ content to said front stage vapor-liquid mixer and supplying treating gas containing an $SO_2$ content greater than said first content to the rear stage.

3. The waste paper de-inking process according to claim 1, wherein the treating gas supplied to said vapor-liquid mixer is high temperature factory exhaust gas.

4. The waste paper de-inking process according to claim 1, further comprising attaching at least one said vapor-liquid mixer intermediate of a plurality of floatator rows.

5. The process according to claim 1, further comprising feeding said treated slurry to a subsequent de-inking floatation step.

6. A waste paper de-inking process comprising
   supplying waste paper fiber dissolving slurry from above a high-tower multi-stage vapor-liquid mixer having at least one porous plate in each of a plurality of stages arranged in a vertical column, and supplying de-inking treating gas which does not damage the fiber from below said vapor-liquid mixer, said waste paper dissolving slurry thus supplied dropping from porous plates of the respective stages to lower stages, and said de-inking treating gas being raised from the porous plates of the respective stages to upper stages to form an agitated mixture layer of the waste paper dissolving slurry and the treating gas on each porous plate of the respective stages, and, in the agitated mixture layer, separating and finely pulverizing adhered matters adhered to the fiber and foreign matters in the waste paper dissolving slurry, absorbing, containing and foaming the de-inking treating gas in the waste paper dissolving slurry, to form an agitated mixture layer and a foam layer, said separated and finely pulverized adhered and foreign matters being gathered in the foam, discharging said foam layer from each respective stage and gathering the treated slurry in a bottom of the vertical column.

7. The waste paper de-inking process according to claim 6, wherein de-inking agent is added to the waste paper fiber dissolving slurry supplied to said vapor-liquid mixer.

8. The waste paper de-inking process according to claim 6, wherien de-inking agent is added to each respective agitated mixture layer on the porous plates in said vapor-liquid mixer.

9. The waste paper de-inking process according to claim 6, wherein two of said vapor-liquid mixers are used in series to form a process having front and rear stages, and further comprising supplying treating gas containing a first $SO_2$ content to said front stage vapor-liquid mixer and supplying treating gas containing an $SO_2$ content greater than said first content to the rear stage.

10. The waste paper de-inking process according to claim 6, wherein the treating gas supplied to said vapor-liquid mixer is high temperature factory exhaust gas.

11. The waste paper de-inking process according to claim 6 further comprising attaching at least one said vapor-liquid mixer intermediate of a plurality of floatator rows.

12. The process according to claim 6, further comprising feeding said treated slurry to a subsequent de-inking floatation step.

* * * * *